United States Patent
Flattinger et al.

(10) Patent No.: US 9,144,857 B2
(45) Date of Patent: Sep. 29, 2015

(54) WELDING TORCH WITH A TORCH HOUSING AND DRIVE FOR WELDING ROD TRANSPORT

(71) Applicant: FRONIUS INTERNATIONAL GMBH, Pettenbach (AT)

(72) Inventors: Guenther Flattinger, Pasching (AT); Manfred Schoerghuber, Wels (AT); Karin Himmelbauer, Wolfern (AT)

(73) Assignee: Fronius International GmbH, Pettenbach (AT)

( * ) Notice: Subject to any disclaimer, the term of this patent is extended or adjusted under 35 U.S.C. 154(b) by 160 days.

(21) Appl. No.: 14/102,931

(22) Filed: Dec. 11, 2013

(65) Prior Publication Data

US 2014/0097166 A1    Apr. 10, 2014

Related U.S. Application Data

(62) Division of application No. 10/588,402, filed as application No. PCT/AT2005/000030 on Feb. 2, 2005, now Pat. No. 8,642,922.

(30) Foreign Application Priority Data

Feb. 4, 2004   (AT) .................................. A 160/2004

(51) Int. Cl.
*B23K 9/12*      (2006.01)
*B23K 9/133*     (2006.01)
(Continued)

(52) U.S. Cl.
CPC .............. *B23K 9/1336* (2013.01); *B23K 9/133* (2013.01); *H02K 5/08* (2013.01); *H02K 7/003* (2013.01); *H02K 7/083* (2013.01); *H02K 7/14* (2013.01)

(58) Field of Classification Search
CPC ............ B23K 9/10; B23K 9/12; B23K 9/133; B23K 9/1333
USPC ................. 219/76.14, 137.31, 137.2, 137.62, 219/137.63, 137.7
See application file for complete search history.

(56) References Cited

U.S. PATENT DOCUMENTS

| | | |
|---|---|---|
| 2,808,498 A | 10/1957 | Hudson et al. |
| 3,414,197 A | 12/1968 | Proust |

(Continued)

FOREIGN PATENT DOCUMENTS

| | | |
|---|---|---|
| CH | 306 158 A | 3/1955 |
| DE | 295 12 235 U1 | 11/1996 |

(Continued)

OTHER PUBLICATIONS

European Office Action dated May 12, 2014 in European Application No. 13198405.6 with English translation of relevant parts.

(Continued)

*Primary Examiner* — Brian Jennison
(74) *Attorney, Agent, or Firm* — Collard & Roe, P.C.

(57) ABSTRACT

A welding torch includes a torch housing and, preferably, a tube bend fastenable thereto. A drive unit for feeding a welding wire is arranged in the torch housing and is formed by at least a drive roller and a pressure roller, as well as a drive motor. Part of the torch housing is designed as a component of the drive unit. A rotor, in particular a motor shaft, of the drive motor is fastened to the torch housing via a bearing or bearings to stabilize and position the rotor. A welding wire feed drive motor includes bearings, a rotor, in particular a motor shaft and a rotor winding or rotor magnets, and a stator pack, in particular stator winding or stator magnets. At least a part of the motor shaft, in particular the retention zone of a drive roller, is electrically insulated from the stator housing or base body.

11 Claims, 15 Drawing Sheets

(51) Int. Cl.
*H02K 5/08* (2006.01)
*H02K 7/00* (2006.01)
*H02K 7/08* (2006.01)
*H02K 7/14* (2006.01)

(56) References Cited

U.S. PATENT DOCUMENTS

| | | |
|---|---|---|
| 4,320,931 A | 3/1982 | Shaffer |
| 4,845,336 A | 7/1989 | Samokovliiski et al. |
| 4,937,417 A | 6/1990 | Fox |
| 4,954,690 A | 9/1990 | Kensrue |
| 5,326,958 A | 7/1994 | Geus |
| 5,595,671 A | 1/1997 | David |
| 6,064,036 A | 5/2000 | Kensrue |
| 6,123,000 A | 9/2000 | Stewart et al. |
| 6,225,599 B1 | 5/2001 | Altekruse |
| 6,756,712 B1 | 6/2004 | Schüren |
| 2002/0153783 A1 | 10/2002 | Lau |
| 2004/0016788 A1 | 1/2004 | Huismann et al. |
| 2004/0020911 A1 | 2/2004 | Centner |

FOREIGN PATENT DOCUMENTS

| | | |
|---|---|---|
| DE | 196 10 736 A1 | 9/1997 |
| DE | 199 48 145 C1 | 6/2001 |
| EP | 0 982 835 A1 | 3/2000 |
| EP | 1 353 433 A2 | 10/2003 |
| GB | 911 649 A | 11/1962 |
| GB | 1 080 125 A | 8/1967 |
| GB | 1 093 736 A | 12/1967 |
| GB | 1 134 664 A | 11/1968 |
| GB | 1 449 232 A | 9/1976 |

OTHER PUBLICATIONS

International Search Report of PCT/AT2005/000030, mailed Aug. 3, 2005.

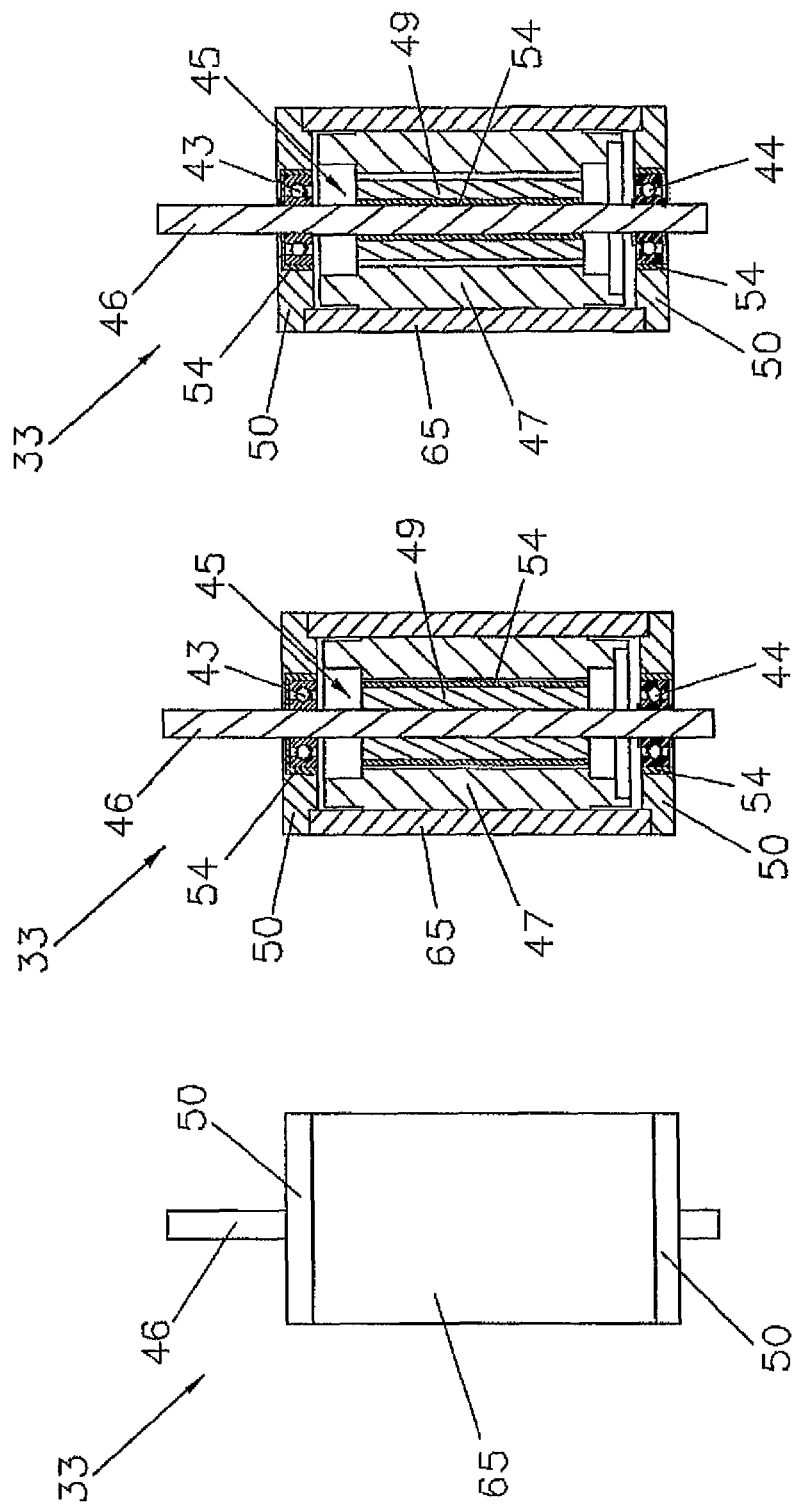

WELDING TORCH WITH A TORCH HOUSING AND DRIVE FOR WELDING ROD TRANSPORT

CROSS REFERENCE TO RELATED APPLICATIONS

This application is a divisional of and Applicant claims priority under 35 U.S.C. §120 and 121 of U.S. application Ser. No. 10/588,402 filed on Aug. 3, 2006, which application claims the benefit as a National Stage entry of a PCT application pursuant to 35 U.S.C. §371 of International Application No. PCT/AT2005/000030 filed on Feb. 2, 2005, published in the German language, which in turn claims priority under 35 U.S.C. §119 of Austrian Application No. A 160/2004 filed on Feb. 4, 2004, the disclosures of each of which are incorporated by reference. A certified copy of priority Austrian Application No. A 160/2004 is contained in parent application Ser. No. 10/588,402.

BACKGROUND OF THE INVENTION

1. Field of the Invention

The invention relates to a welding torch including a torch housing and, preferably, a tube bend capable of being fastened thereto, wherein a drive unit for feeding a welding wire is arranged in the torch housing and the drive unit is formed by at least one pair of rollers, in particular a drive roller and a pressure roller, as well as a drive motor.

2. Prior Art

From the prior art, it is known that drive motors used in welding torches are designed as independent assemblies. In those cases, the drive motor has its own stator house, which carries or incorporates all elements like the stator windings or stator magnets, the rotor with the stator pack, in particular rotor windings or rotor magnets, the bearings for the rotor, the end shield and a motor plate. That independent drive motor assembly is fastened to the torch housing. In order to increase the feeding power, a gearbox is fastened to the motor shaft, with a drive roller being attached to the latter to enable wire feeding with an associated pressure roll. This involves the disadvantage of requiring additional or more space, since that stator housing has to be realized in a particularly stable manner for the fixation of the bearing. Another disadvantage resides in that no optimum cooling of the drive motor is feasible, since the forming rotor heat is taken up by the stator housing and no optimum heat removal takes place on account of small cooling surfaces or respective transition resistances to the welding torch.

Another variant embodiment comprises a freely located, aircooled drive motor. Since in that case cooling is effected via the stator housing, it is disadvantageous that only a very small cooling surface is available.

GB 911 649 A, U.S. Pat. No. 4,845,336 A, GB 1 134 664 A, GB 1 080 125 A and GB 1 093 736 A, for instance, describe welding torch constructions including drive motors which are designed as independent assemblies including their own stator housings.

SUMMARY OF THE INVENTION

The object of the present invention, therefore, resides in providing a welding torch or wire feed unit, respectively, of as small a structural size as possible and comprising an electric drive unit. Another object of the invention consists in providing improved cooling of the drive unit so as to increase its service life.

An object of the invention also resides in providing an electric drive motor, which ensures an electric potential separation between the drive roller and the stator housing and/or welding torch.

The object underlying the invention is achieved in that a part of the torch housing is designed as a component of the drive unit, wherein a bearing for mounting the rotor, in particular motor shaft, is fastened to the torch housing to stabilize and position said rotor. This offers the advantage of manufacturing tolerances between the position of the motor shaft and the welding wire feed axis being reduced due to the bearing site being located directly on the torch housing or base body, with the only manufacturing tolerance occurring when mounting the bearings within the torch housing, while the constructions known from the prior art involve tolerance chains due to the the end shield being mounted on the welding torch.

Another advantage resides in that a reinforced bearing can be used and, hence, adapted to the necessary loads of the welding wire feed. An essential advantage resides in that, due to the bearing being installed in the torch housing, the distance between the bearing and the drive roller can be reduced so as to reduce the bending moment on the motor shaft and increase the service life of the motor shaft. An essential advantage resides, above all, in that optimum cooling is provided for the motor parts of the drive motor, since the welding torch or torch housing can now be utilized as cooling surfaces, thus substantially increasing service life. It is essential that the heat formed by the drive motor no longer has to be transmitted from a stator housing to a cooling surface, as is known from the prior art, but that the formed heat is immediately introduced directly into the torch housing. Hence, there are no more transition surfaces on which heat can build up, which may lead to an overheating of the drive motor.

A configuration according to an embodiment is also advantageous in that, due to the direct integration of the drive motor in the torch housing, the stator housing usually provided at the drive motor can be omitted such that less space for the drive motor is required in the welding torch so as to reduce the structural size and weight of the welding torch. Consequently, also the accessibility in robotic applications is substantially enhanced by the compact, small design and low weight. A particular advantage also resides in that the cross section for the transmission of force is increased, whereas in the prior art the cross section available for the transmission of force between the torch retainer and the tube bend is reduced due to the free arrangement of the motor, which causes a reduction of the strength of the welding torch.

The configuration according to another embodiment is advantageous, since the torch housing can thereby be composed of parts made of different materials and having different material thicknesses so as to achieve considerable weight savings. The individual torch housing parts can be made of different materials by different manufacturing processes such as, for instance, injection moldings or sheet metals, etc., so as to enable the optimum adaptation of said parts to the respective application such as, for instance, drive motor cooling, welding torch rigidity, etc.

Moreover, the configuration according to another embodiment is advantageous, since it allows, for instance, the production of the base body as a casting part and, hence, a saving of weight and an increase in strength.

By the configuration according to other embodiments, it is provided in an advantageous manner that the stator pack is fixedly connected with the torch housing such that vibrations will not have any effect on the fixation of the drive motor, whereas, according to the prior art, the fixation of the motor to the burner housing may be loosened by vibrations. It is, furthermore, advantageous that a high strength is provided due to the enlarged cross section of the torch housing as compared to a stator housing used in the prior art.

Yet, a configuration according to other embodiments is advantageous too, since no additional intermediate pieces for the bearings are, therefore, required. Another advantage resides in that, due to the elevated strength and stiffness of the torch housing as compared to a conventional stator house, a reinforced bearing can be used such that the service life will be substantially enhanced.

Also a configuration according to another embodiment is of advantage, providing simple mounting and a high strength.

A configuration according to another embodiment is advantageous too, since it enables the use of a rotor known from the prior art, which will reduce costs.

Also advantageous is a configuration according to another embodiment, since it offers an excellent protection of the motor parts. At the same time, the use of an insulation plate allows the latter to be employed as a seal of the motor parts, providing simple and optimum sealing over a large area. It is, furthermore, advantageous that a contact between the welding wire and the torch housing will be prevented.

A configuration according to another embodiment is advantageous, since thereby a low mass moment of inertia as well as a rapid response behavior of the drive unit during welding wire feeding will be achieved.

The configuration according to another embodiment advantageously ensures that a change in the transmission of force or rotational speed is readily enabled by the use of a gear.

However, a configuration according to another embodiment is also advantageous, since it allows for a further reduction in weight and, at the same time, an enlargement of the inner volume of the welding torch.

A configuration according to another embodiment advantageously ensures that there will be no transition resistances for the heat removal of the drive motor such that optimum cooling of the drive motor will be achieved.

Also advantageous is the configuration according to another embodiment, in which cooling of the drive motor does not exclusively occur by the ambient air, but heat is additionally carried off by the aid of a coolant. Due to the integration of cooling channels directly in the housing, no additional cooling ducts are required. If, however, cooling ducts are used, a simpler torch housing construction and, hence, reduced costs will be feasible. With a combination of cooling channels and cooling ducts, optimum cooling of the motor parts will be provided so as to enable the use of high-performance drive motors in the torch housing.

By the configuration according to another embodiment, an enlargement of the surface of the torch housing and, hence, an even better cooling will be achieved.

The configuration according to another embodiment is also advantageous, since, in the event of a manual welding torch, the grip part is used to integrate the drive motor, so that a very small manual welding torch offering excellent handling properties will be realized.

The configuration according to another embodiment is advantageous too, since it allows the assembly to be used with planetary gears or other types of gears. In addition, a further reduction of the structural dimensions will be achieved.

The configuration according to another embodiment is also advantageous, since the sensor signals are thereby transmitted to the control electronics via short lines, thus reducing the susceptibility to failures. In this respect, it is further possible to establish a simple communication with external control devices, for instance, via a serial bus.

An advantage of the configuration according to another embodiment resides in that with an external control device the control electronics within the welding torch can be reduced or omitted and the costs of the welding torch can, hence, be reduced.

By the configuration according to another embodiment, it is advantageously achieved that a control procedure such as, for instance, the start of the welding process or the threading-in of the welding wire can be triggered directly from the welding torch, thus providing user-friendliness.

Yet, also a configuration according to another embodiment is of advantage, since it allows for the combination of different materials so as to provide optimum handling and a very low weight of the welding torch. As a result, costs will be reduced too.

The configuration according to another embodiment in an advantageous manner enables assembly expenses for the welding torch to be kept as low as possible, since the use of a mounting plate will facilitate the assembly of the inner mechanism of the welding torch and enable the preassembled mounting plate including the components or parts mounted thereon to be subsequently merely installed into the torch housing. It is thereby feasible in an advantageous manner to use always the same torch housing and assemble different embodiments adapted to the respective objectives on the mounting plate(s).

The configuration according to other embodiments is also advantageous, since as a function of the application of the welding torch, the respectively optimum drive motor can each be integrated in the same.

The configuration according to other embodiments offers the advantage that the insulation will prevent a short-circuit and, hence, a resulting welding current flow over the housing of the welding torch to ensure user safety. Moreover, it is achieved that the motor parts will be insulated and, hence, protected to increase operational safety.

However, the configuration according to another embodiment is also of advantage, since it enables the power transmission from the welding current supply of the welding apparatus to the connection site for the tube bend, i.e. the power supply for the contact tube, to take place via the torch housing or parts of the torch housing, so that the respective power lines within the torch housing can be omitted. It also provides easy cooling of the live parts.

The configuration according to another embodiment in an advantageous manner will prevent a user from touching any of the live parts and, hence, risk of an electric shock or a short-circuit when contacting the workpiece.

With a configuration according to another embodiment, it is advantageously ensured that in the automatic use of the welding torch, e.g. on a robot, no current flow will take place between the retainer body and the welding torch, and a failure safety on account of a welding wire flow through the system will be provided.

The configuration according to another embodiment is also advantageous, because it offers the optimum adaptability to the respective field of application of the welding torch. It is, thus, possible to produce a basic welding torch and modify the drive motor using additional modules as a function of its application, in order to enable an adaptation of the power or output of the drive motor and/or the control quality and/or dynamic response behavior of the drive motor without having to exchange the whole welding torch.

The configuration according to another embodiment is advantageous too, since it enables an actual value detection of the state or motor movement of the drive motor directly in the welding torch and, hence, appropriate controlling at a deviation from the set value. As a result, an excellent welding quality will be achieved.

Yet, also the configuration according to another embodiment is advantageous, since it allows for the implementation of an automatic recognition of the parameters of the drive motor so as to enable the independent adaptation of the control and, in particular, controlling parameters by the welding system.

Also advantageous is the configuration according to another embodiment, which allows for the use of a welding torch having several drive motors so as to obtain a higher wire feeding power or enable the use of smaller drive motors.

The configuration according to another embodiment is advantageous too, because is provides a simple structure and a reduced tolerance chain.

The configuration according to another embodiment is also advantageous, because it ensures very simple mounting of the drive unit by the simple insertion into one housing half and the subsequent fixation by means of the other housing half.

The object of the invention will also be achieved by the configuration according to another embodiment. It is thereby reached in an advantageous manner that such a construction of a drive motor integrated in a component can be used in applications other than a welding torch, i.e., such a setup is not only beneficial for welding torches, but also other welding wire feed systems such as, for instance, cold-wire welding wire feeders for WIG or plasma processes or a welding wire feed arranged outside the welding torch can be constructed in this manner.

The invention also relates to a drive motor for feeding a welding wire, including bearings, a rotor, in particular a motor shaft and a rotor winding or rotor magnets, and a stator pack, in particular a stator winding or stator magnets.

In this respect, the object of the invention is achieved in that at least a part of the motor shaft, in particular the retention zone of the drive roller, is electrically insulated from the housing. This offers the advantage that an electric potential on a partial region of the motor shaft is separated from the stator housing or base body and, hence, no current can flow through structural components or interfaces of the welding torch. An essential advantage resides in that no separation of the heat flow from the heat source and, in particular, stator winding takes place to the cooling body and, in particular, torch housing. Another advantage resides in that, for use in welding technology, the driving roller can thus be mounted directly to the motor shaft without any insulation having to be provided in addition, so as to reduce manufacturing expenses and, hence, costs. A further advantage consists in that it is thereby feasible to reduce the manufacturing tolerance chain so as to obtain an enhanced welding wire feed for use in welding technology. Also with use in welding technology, a better connection of the drive roller to the motor shaft will be achieved with the drive roller being directly mounted to the motor shaft by a steel-steel connection.

Further advantageous configurations are contained in other embodiments. The advantages resulting therefrom can be taken from the description.

BRIEF DESCRIPTION OF THE DRAWINGS

The present invention will be described in more detail by way of the accompanying drawings, which show exemplary embodiments of the welding torch. Therein:

FIGS. 14 to 19 show different configurations of an exemplary embodiment of a drive motor as an independent structural unit in simplified, schematic illustrations.

DETAILED DESCRIPTION OF PREFERRED EMBODIMENTS

Figure 1:
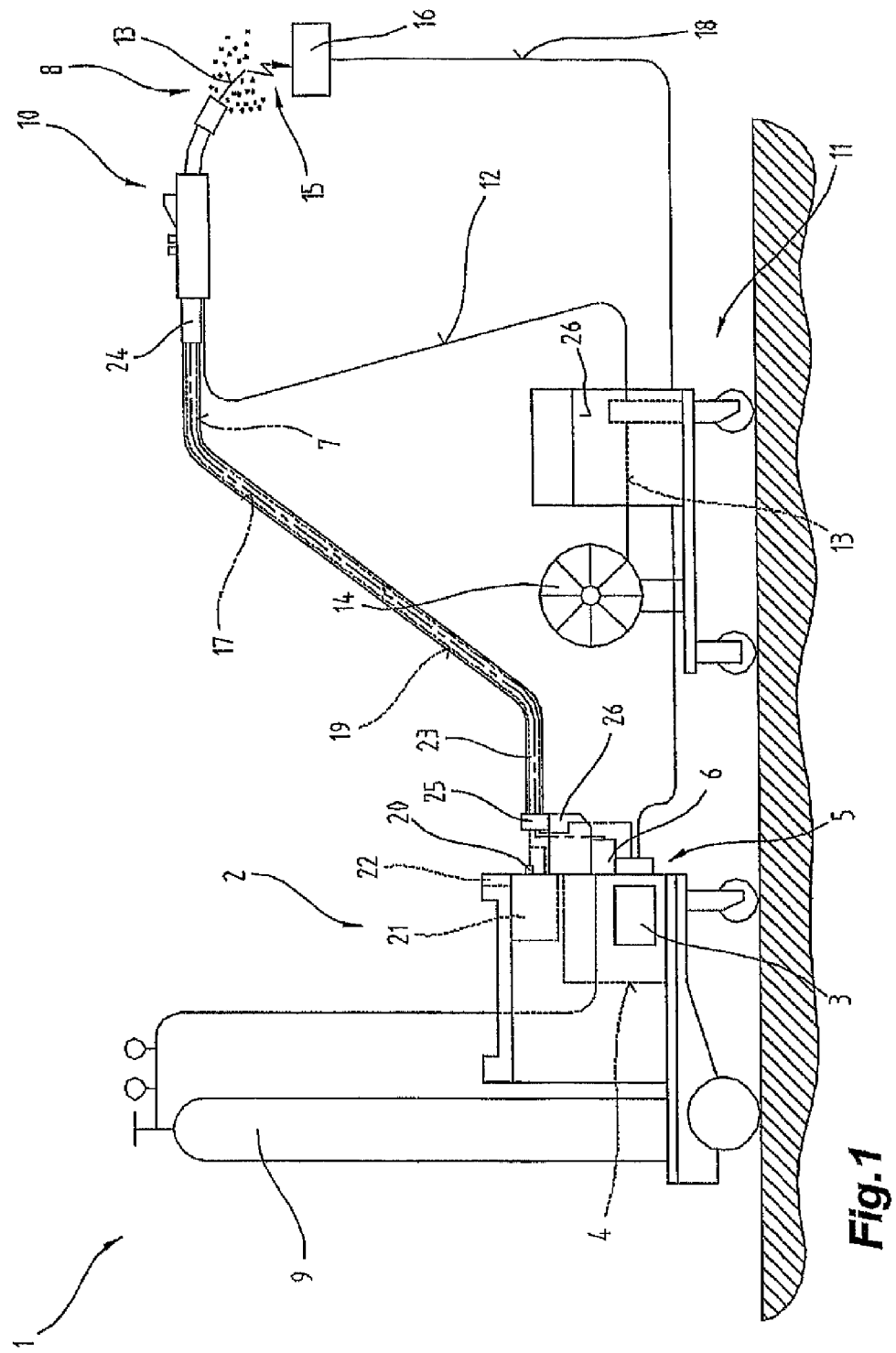
FIG. 1 is a schematic illustration of a welding installation or apparatus.
Figure 2:
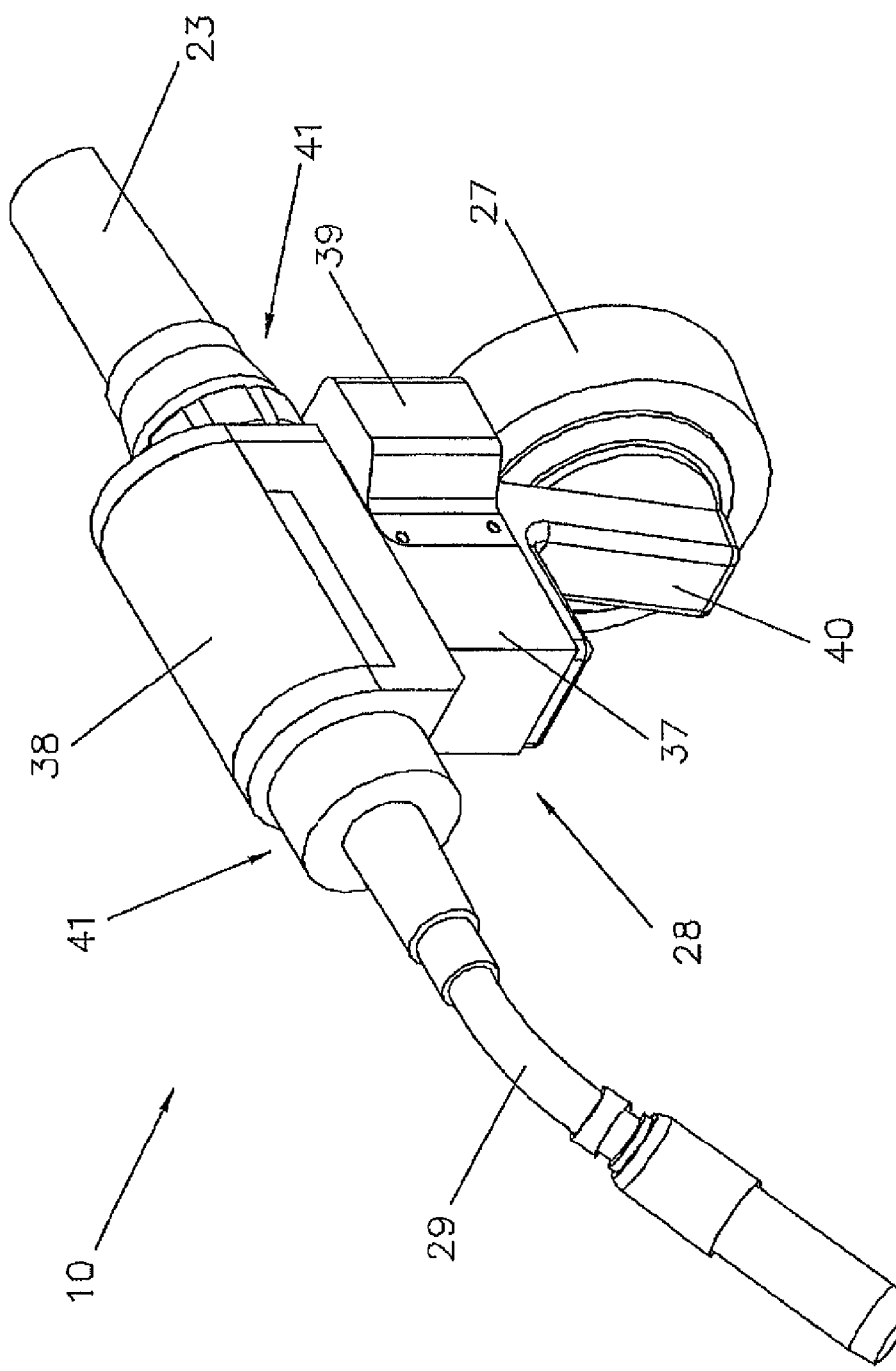
FIG. 2 is an elevational view of a welding torch in the assembled state.
Figure 3:
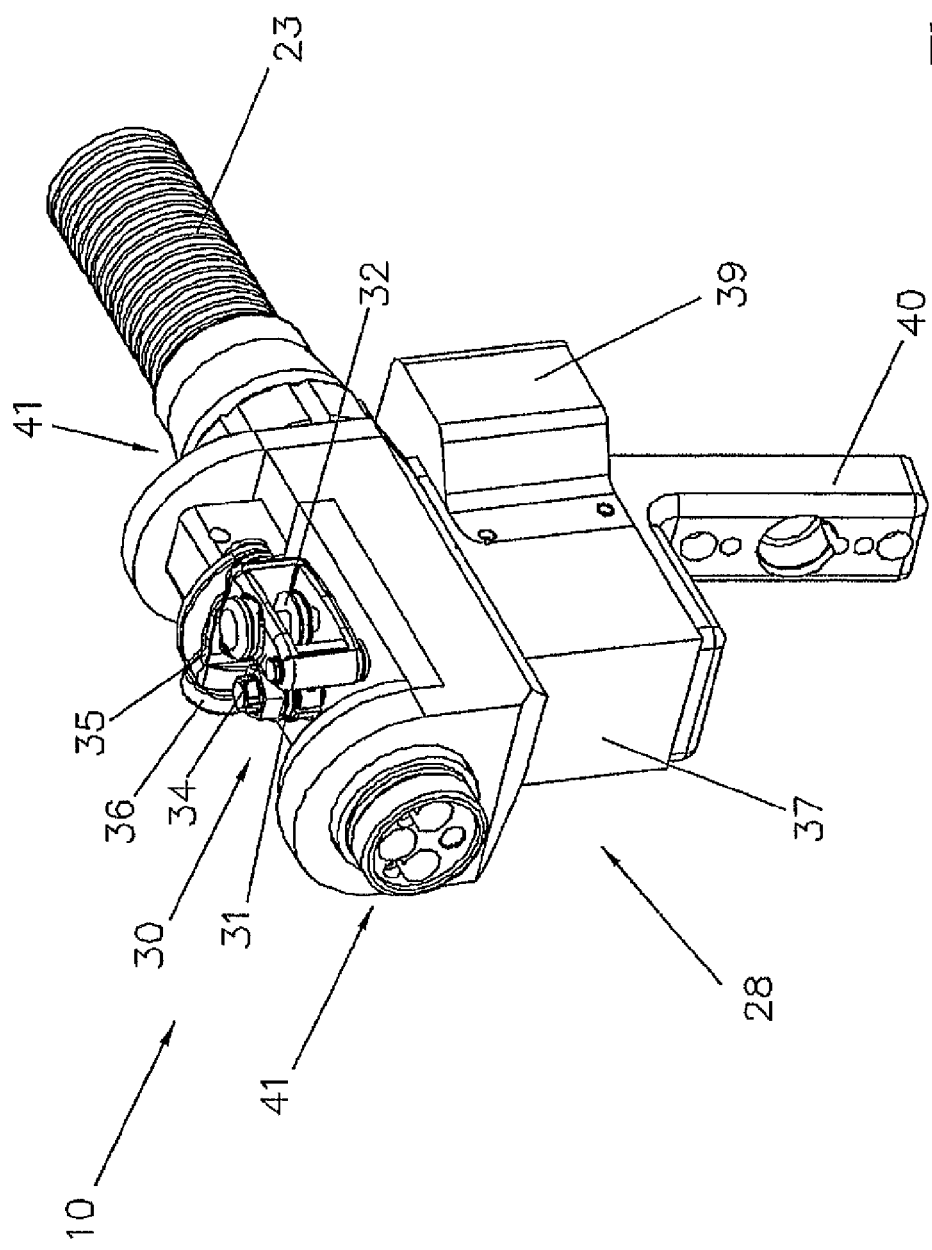
FIG. 3 is an elevational view with the cover part removed.

FIG. 1 depicts a welding apparatus 1, or welding system, for various processes or methods such as, e.g., MIG/MAG welding or WIG/TIG welding, or electrode welding methods, doublewire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8, in particular a protective gas such as, for instance, carbon dioxide, helium or argon and the like, between a gas reservoir 9 and a welding torch 10 or torch.

In addition, a wire feeder 11, which is usually employed in MIG/MAG welding, can be controlled by the control device 4, whereby a filler material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1. It is also feasible for the wire feeder 11 to supply the welding wire 13, or filler metal, to the process site outside the welding torch 10, to which end a non-consumable electrode is preferably arranged within the welding torch 10, as is usually the case with WIG/TIG welding.

The power required to build up an electric arc 15, in particular an operative electric arc, between the electrode or welding wire 13, respectively, and a workpiece 16 is supplied from the power element 3 of the power source 2 to the welding torch 10, in particular electrode, via a welding line 17, wherein the workpiece 16 to be welded, which is preferably formed by several parts, via a further welding line 18 is likewise connected with the welding apparatus 1 and, in particular, power source 2 so as to enable a power circuit for a process to build up over the electric arc 15, or a plasma jet formed.

To provide cooling of the welding torch 10, the welding torch 10 can be connected to a fluid reservoir, in particular a water reservoir 21, by a cooling circuit 19, for instance, via an interposed flow control 20, so as to cause the cooling circuit 19, in particular a fluid pump used for the fluid contained in the water reservoir 21, to be started as the welding torch 10 is put into operation, in order to effect cooling of the welding torch 10 by feeding a cooling medium.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding system or welding apparatus 1 and/or predetermines the respective set values for controlling.

In the exemplary embodiment illustrated, the welding torch 10 is, furthermore, connected with the welding apparatus 1 or welding system via a hose pack 23. The hose pack 23 houses the individual lines from the welding apparatus 1 to the welding torch 10. The hose pack 23 is connected with the welding torch 10 via a coupling mechanism 24, whereas the individual lines arranged in the hose pack 23 are connected with the individual contacts of the welding apparatus 1 via connection sockets or plug-in connections. In order to ensure an appropriate strain relief of the hose pack 23, the hose pack 23 is connected with a housing 26, in particular the basic housing of the welding apparatus 1, via a strain relief means 25. It is, of course, also possible to use the coupling mechanism 24 for connection to the welding apparatus 1.

It should basically be noted that not all of the previously mentioned components have to be used or employed for the various welding methods or welding apparatus 1 such as, e.g., WIG devices or MIG/MAG apparatus or plasma devices. Thus, it is, for instance, possible to devise the welding torch 10 as an aircooled welding torch 10.

FIGS. 2 to 5 schematically illustrate the setup of a welding torch 10 according to the invention, which is used for robotic applications, and wherein the welding torch 10 can be fastened to a manipulator 27 of a robot (not illustrated).

The welding torch 10 comprises at least a torch housing 28 and, preferably, a tube bend 29 capable of being fastened to the former, wherein a drive unit 30 for feeding the welding wire 13 is arranged within the torch housing 28. The drive unit 30 is formed by at least one pair of rollers, in particular a drive roller 31 and a pressure roller 32, as well as a drive motor 33. In order to provide optimum welding wire feeding, it is necessary to build up a defined pressure force on the welding wire 13 via the rollers and, in particular, the pressure roller 32. This is, for instance, feasible in that the pressure roller 32 is movably mounted via a pivot lever 34, said pivot lever 34 being fixed via a tension lever 35. The tension force of the tension lever 35 is varied in a simple manner using a setting device 36, particularly screw, wherein the tension lever 35 presses the pivot lever 34 by the pressure roller 32 in the direction of the drive roller 31. It is thereby reached that the pressure roller 32 is pressed against the drive roller 31 via the rotationally mounted pivot lever 34 so as to build up an appropriate force on the welding wire 13 via the drive roller 31 and the pressure roller 32 as the welding wire is passed therethrough.

In a preferred manner, the torch housing 28 is comprised of several parts such as, for instance, a base body 37, a cover part 38, a control electronics part 39, a torch retainer 40 etc. Furthermore, the welding torch 10 carries coupling mechanisms 41 to which the tube bend 29 and the hose pack 23 can be coupled. A detailed illustration of the internal setup for the laying of lines 42 and/or tubes for feeding media, in particular cooling ducts and gas feed lines as well as a welding power feed line etc., between the coupling devices 41 is obviated for the sake of clarity, so that the respective fastening sites and/or guides are not illustrated.

With the welding torch 10 according to the invention, it is provided that a part of the torch housing 28 is designed as a component of the drive unit 33, wherein bearings 43, 44 for mounting the rotor 45, in particular a motor shaft or the motor shaft 46, are fastened to the torch housing 28 to stabilize and position the rotor 45. A prior art drive motor 33 is usually constructed as a separate structural unit, i.e. with its own stator housing to which the bearings 43, 44 for mounting the rotor 45 are fastened, the prior art drive motor 33 being installed in, or fastened to, the torch housing 28 only as an overall unit.

The integration according to the invention, of the drive unit 30 and, in particular, drive motor 33 in the torch housing 28 and, in particular base body 37, enables the structural size and weight of the welding torch 10 to be substantially reduced, using the torch housing 28 for the stability of the drive motor 33, which means that the bending moments and bearing forces occurring during the operation of the drive motor 33 are taken up by the torch housing 28, whereas, in accordance with the prior art, these forces are transmitted to the stator housing, via which the drive motor 33 is fastened to the torch housing 28 according to the prior art, so as to require a relatively stable stator housing. With the construction according to the invention the torch housing 28, or a part of the torch housing 28, forms the stator housing, wherein, as a function of the design of the drive unit 30, a winding pack, particularly the stator winding 47 of the drive motor 33, is directly installed, particularly pressed, glued or shrunk, in the torch housing 28 and, in particularly, base body 37. In this respect, it is also possible to press or install magnets, in particular the stator magnets, directly into the torch housing 28, particularly base body 37, if a respective drive motor of such a design is used. In this case, the base body 37 is preferably made of one part. In the base body 37, an appropriate free space or opening 48 is provided for the integration of the stator pack, into which the stator winding 47 or the stator magnets are pressed in or installed.

Furthermore, at least one bearing 43, 44, yet preferably two bearings 43, 44, for the rotor 45 of the drive motor 33 are directly connected with the torch housing 28, particularly base body 37, wherein the rotor 45 is designed as a motor shaft 46 including a rotor pack, in particular rotor winding 49 or rotor magnet, so that the motor shaft 46 is rotationally mounted on the base body 37 via bearings 43, 44 and the rotor pack is arranged within the stator pack, in particular stator winding 47 or stator magnets. An intermediate piece 50 or bearing shield is preferably used to fasten the bearing 43, 44, said intermediate piece 50 with the integrated bearing 43 being fastened to the torch housing 28 and, in particular, base body 37. In this respect, it is possible to provide an insulation plate 51 on the intermediate piece 50 as an electrical insulation. It is, of course, also possible that the intermediate piece 50 is made of an electrically non-conductive material and the bearing 43, 44 is embedded in the intermediate piece 50 so as to provide an appropriate insulation plane.

In the exemplary embodiment illustrated in FIGS. 2 to 5, the opening 48 for the stator pack is designed to have approximately the same diameter as the stator pack, i.e. the stator winding 47, the opening 47 extending throughout the entire base body 37. Mounting of the components of the drive motor 33 is, thus, feasible on both ends. In the end region of the opening 48, the intermediate pieces 50 with the bearing 43, 44 are subsequently mounted. To this end, the rotor 45 is inserted into the opening 48, i.e. the stator, after having mounted the stator winding 47, with the bearings 43, 44 being subsequently fastened to the motor shaft 46 and the latter being fastened to the base body 37 via the intermediate piece 50 so as to ensure the stabilization and positioning of the rotor 45 in the center of the stator pack. Thus, the functionality of a commercially available drive motor 33 is provided, with essential advantages resulting from its integration in the housing of the welding torch 10.

Figure 5:
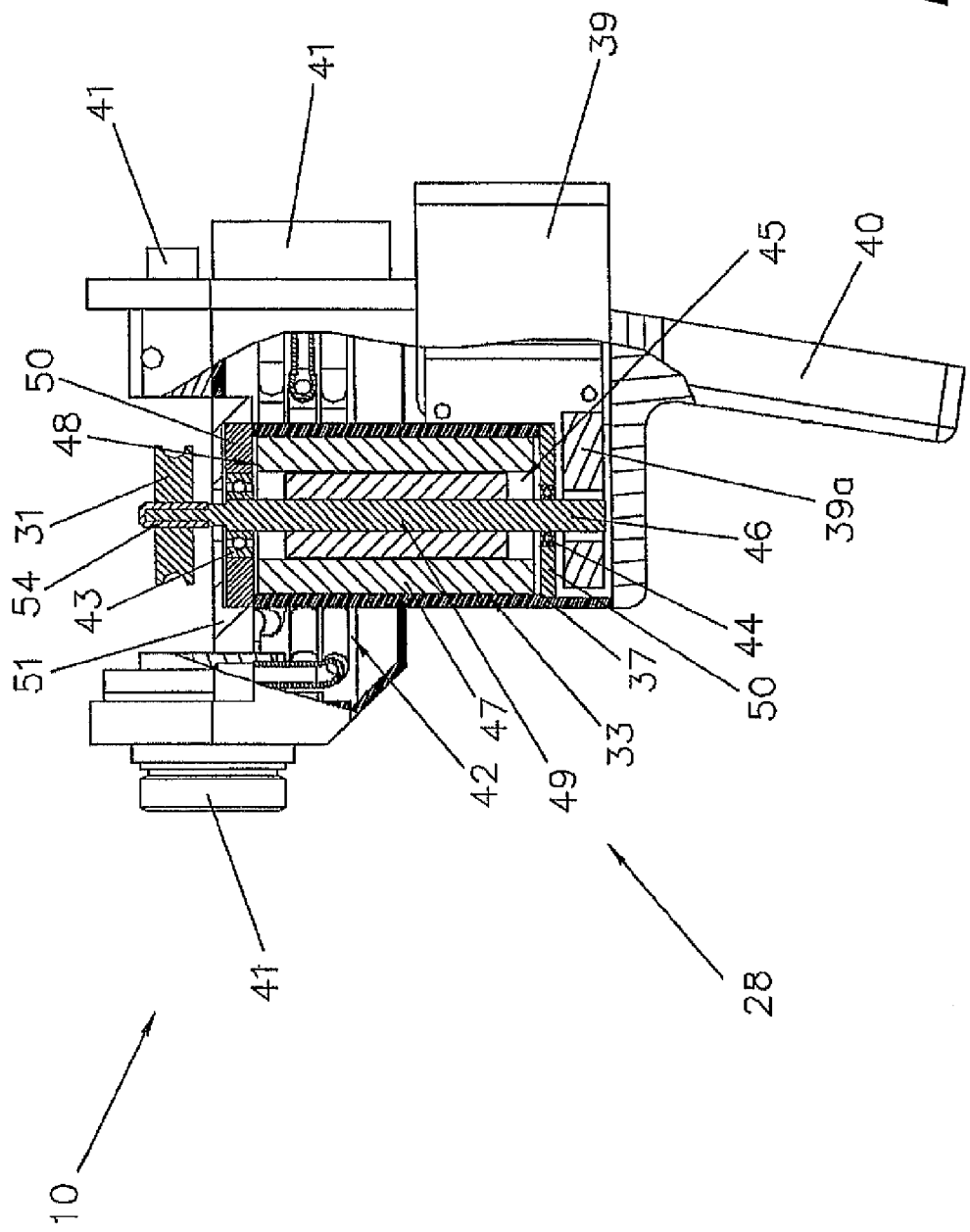
FIG. 5 is a section through the welding torch in a side view and simplified, schematic illustration.

In order to enable feeding of the welding wire 13, the drive roller 31 subsequently is preferably directly connected with the motor shaft 46, as is schematically illustrated in FIG. 5, so as to allow for the mounting of the pressure roller 32, which is fastened to the pivot lever 34. The welding wire 13 can be conveyed by the drive unit 30 according to the direction of rotation of the drive roller 31. In the exemplary embodiment illustrated, the welding wire 13 is supplied independently of the hose pack 23, via its own welding wire feed hose (not illustrated) which is coupled to the welding torch 10 by a further coupling mechanism 41 and, in particular, quick-lock. The connection of the drive roller 31 with the drive motor 33 can be realized in a manner such that either the drive roller 31 is directly fastened to the motor shaft 46 as illustrated in FIG. 5 or the motor shaft 46 is connected with a gear (not illustrated) with the drive roller 31 being coupled to said gear. When using a gear, the feeding power can be substantially increased. The insulation plate 51 and/or the intermediate piece 50 in this case can be arranged on the end face of the gear, or simply omitted.

Figure 4:
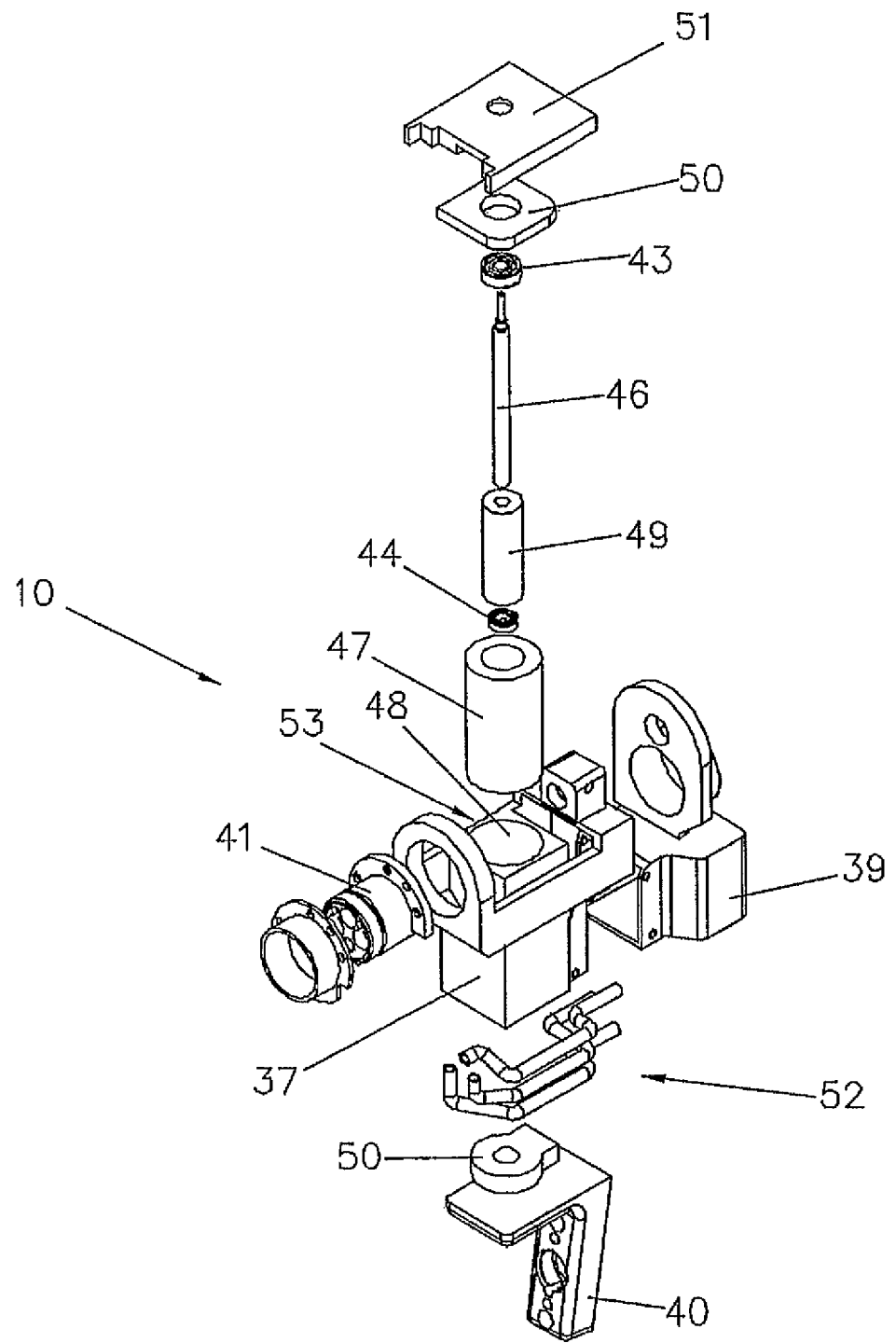
FIG. 4 is an explosive view of the welding torch and the integral drive motor in a simplified, schematic illustration.

In order to ensure optimum cooling of the drive motor 33, it is possible that the torch housing 28, in particular the base body 37, is designed as a cooling body, i.e., the torch housing 28 or a part of it, particularly the base body 37, is made of a heat-conductive material, in particular aluminum, so as to enable an excellent discharge of the heat generated by the electric drive unit 30. To this end, it is also possible that the torch housing 28 or base body 37 comprises cooling channels (not illustrated) in the region of the drive motor 33, i.e. stator pack, which means that cooling channels are directly incorporated in the material of the base body 37. It is further possible to arrange cooling ducts 52 as schematically indicated in FIG. 4 in addition to, or instead of, the cooling channels. In a preferred manner, the cooling channels and/or cooling ducts 52 are line-connected with a cooling circuit so as to enable a cooling liquid or cooling gas or air to be conveyed through the cooling channels or cooling ducts 52 and, hence, the heat to be carried off. It is, of course, also possible to couple the cooling channels or cooling ducts 52 with the gas supply to the welding torch 10 so as to enable the gas 8, in particular protective gas, to be used for cooling the drive unit 30 and, at the same time, building up a protective gas atmosphere on the welding site. When using cooling channels and/or cooling ducts, it is also possible to make the torch housing 28 or base body 37 of a poorly heat-conductive material, for instance plastic, with sufficient heat having to be carried off by the cooling medium through appropriately dimensioned cooling channels or cooling ducts.

If the torch housing 28, in particular the base body 37, is designed as a cooling body, good air-cooling will be essential, i.e., a very large surface will have to be provided for air-cooling. To this end, it is possible that the torch housing 28 or base body 37 comprises cooling ribs 53 on its outer side, as is schematically indicated in FIG. 4, in order to produce an even larger surface. It is, of course, also possible to make the housing 28 or base body 37 of a thermally well conductive material for air-cooling while, at the same time, using cooling channels and/or cooling ducts 52 for liquid cooling. The welding torch 10 may consequently be used for very high outputs and, in particular, high welding currents, while nevertheless keeping the structural size and weight low, since excellent cooling is provided in any event. If, however, a welding torch 10 is to be built with as little weight as possible, the torch housing 28, or part of it, can be made of a synthetic material, since heat losses will be carried off via an appropriate cooling system.

To control the drive motor 33 in terms of speed, output and/or torque, a sensor or control electronics (not illustrated) can be used in the torch housing 28 to control the drive motor 33. In the exemplary embodiment illustrated, a separate sensor or control electronics part 39 is connected with the base body 37. The control electronics is specifically arranged in the detachably connected control electronics part 39 so as to provide sufficient space. It is, of course, possible to place the control electronics not in a extra control electronics part 39, but integrate it directly in the base body 37, for instance beside the drive motor 33. The configuration and function of the control electronics will not be described in detail, since any structure known from the prior art can be used for this purpose, a variety of control electronics being applicable as a function of the type of the drive motor 33. By the separate arrangement in a special control electronics part 39, an exchange of the control electronics is readily feasible too. It is, for instance, possible to configure the drive motor 33 integrated in the base body 37 as a synchro motor or direct-current motor or step motor. By using an extra control electronics part 39 which can be coupled to the base body 37, sufficient space will be available for different control electronics so as to enable a conversion of the welding torch 10, or the use of an accordingly larger control electronics part 39 in the case of an increased amount of control electronics, without having to exchange the whole welding torch 10 for a different control electronics, as is frequently necessary with welding torches 10 known from the prior art. It is also possible to arrange the control electronics for the drive motor 33 externally, particularly within the welding apparatus 1 or a wire feed device 11 etc., which will subsequently be line-connected with the drive motor 33, so that the control electronics part 39 can be omitted. It is, of course, also possible to effect the respective control directly from the control device 4 of the welding apparatus 1 or any other control device of another component, so that no extra control electronics will be required for the drive motor 33 in the welding torch 10.

For a better control, an encoder 39*a* may, moreover, be connected with the rotor 45 or the drive roller 31. As encoder, any encoder known from the prior art, e.g. an incremental encoder, can be used. It is, furthermore, advantageous that the individual parts of the drive unit 30, for the recognition of the characteristics of the drive motor 33, may comprise a memory module such as, e.g. a transponder, to enable automatic recognition such that the respective program and/or data for the drive unit 30 employed can be loaded or applied by the welding apparatus 1 or by the control electronics.

In order to ensure the safety of the components of the control electronics and other parts of the drive motor 33 as well as the reliability of the welding torch 10, it will be advantageous if an insulation is arranged between the drive roller 31 and the base body 37, since the transmission of welding current to the welding wire, as a rule, is effected via a contact tube in the end region of the tube bend 29, whereby the welding voltage potential is conducted via the welding wire 13 to the drive roller 31 and, hence, to the drive motor 33. In the event of a short-circuit, the resulting high welding current would cause damage to individual torch components or the entire torch, which will be prevented by the attachment of an insulation. To this end, the insulation is preferably comprised of an insulation layer 54 made of an electrically non-conductive material and formed between the drive roller 31 and the motor shaft 46 and/or the motor shaft 46 and the rotor pack and/or the motor shaft 46 and the bearings 43, 44 and/or the rotor pack and the stator and/or the stator and the torch housing 28. A detailed illustration of specific insulation arrangements will be shown and described in the Figures to come. It is also possible that the drive roller 31 and/or motor shaft 46 are made of an electrically non-conductive material or parts of electrically non-conductive material.

In the exemplary embodiment illustrated in FIGS. 2 to 5, the insulation layer 54 is applied on the motor shaft 46 over a partial region, particularly its end region, with the drive roller 31 being mounted in this region of the insulation layer 54. Thus, an insulation between the drive roller 31 and the drive motor 33, i.e. between the motor shaft 46 and the drive roller 31, is provided so as to prevent welding current from being transmitted onto the rotor pack and provide protection from the welding current also to the remaining structural elements. The insulation layer 54 can, for instance, be made of a plastic or ceramic material. It is also possible to make the entire drive roller 31 of an electrically non-conductive material, in which case no current transmission to the motor shaft 46 will occur, either. It is, of course, also possible to design the motor shaft 46 in two parts, said two parts being interconnected so as to be electrically insulated relative to each other by an insulating coupling.

Furthermore, special configurations of the welding torch 10 may be envisaged. Thus, it is, for instance, possible that the torch housing 28 or a part of it, particularly the base body 37, is designed as a live part, in particular, for the transmission of the welding current, which means that the welding current fed via the hose pack 23 is conducted through the electrically conductive material or torch housing 28 to the tube bend 29, or a connection element for the tube bend 29. The current cable or current transmission element provided in the torch housing 28 between the two coupling mechanisms 41 can, thus, be dropped. It is, however, also necessary to externally protect from contacting the housing part via which the welding current is conducted. This is, for instance, feasible in that an insulation layer or an electrically non-conductive hood (not illustrated) is applied over the torch housing 28 or its live part. In a preferred manner, an insulation layer (not illustrated) is also provided between the torch retainer 40, in particular extension part, and the torch housing 28, in particular the base body 37, in order to prevent in any event a short-circuit via the robot and, in particular, the manipulator 27. To this end, it is possible to make the torch retainer 40 and/or attachment part of a electrically non-conductive material, wherein it has to be taken care that the torch retainer 27 is made as rigid as possible for the welding torch 10 to remain in the same position all the time.

Figure 6:
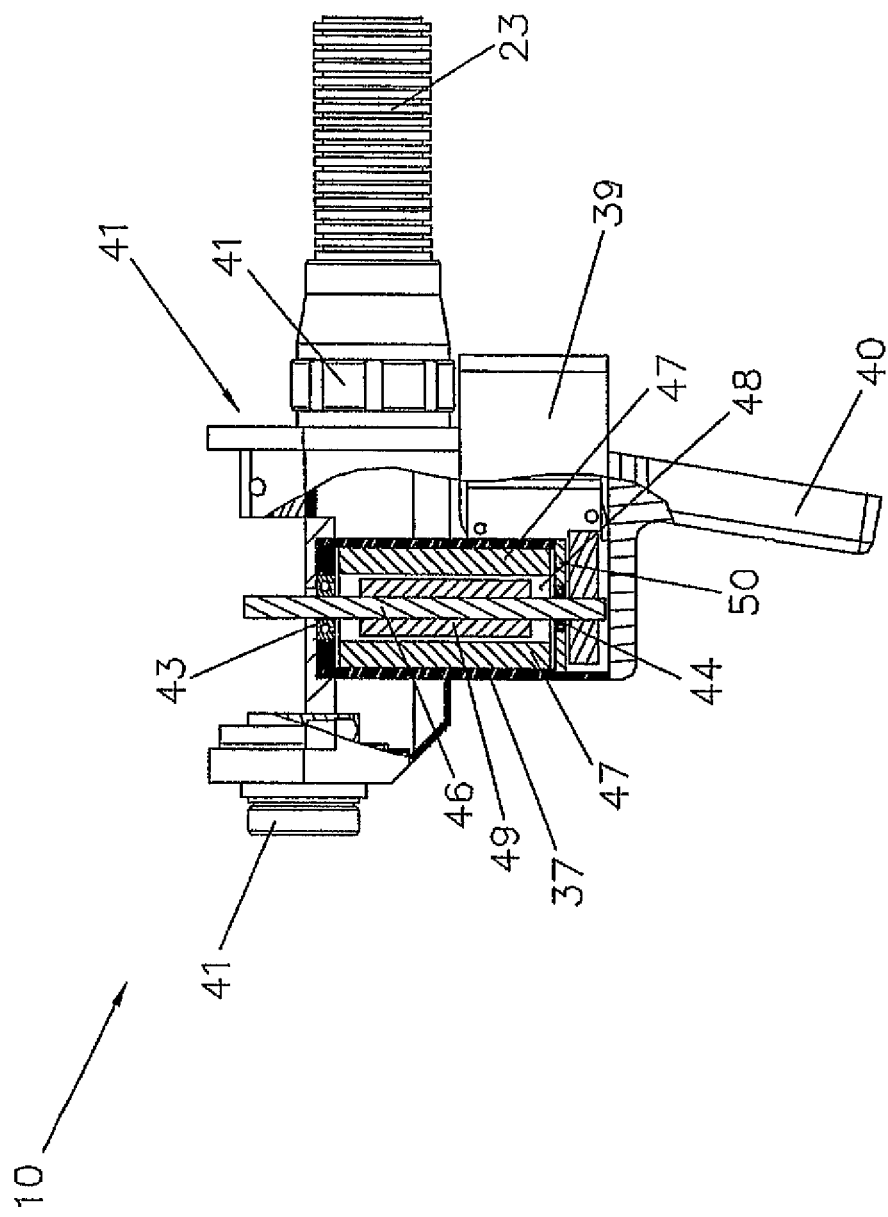
FIG. 6 shows another embodiment of the welding torch in a simplified, schematic illustration.
Figure 7:
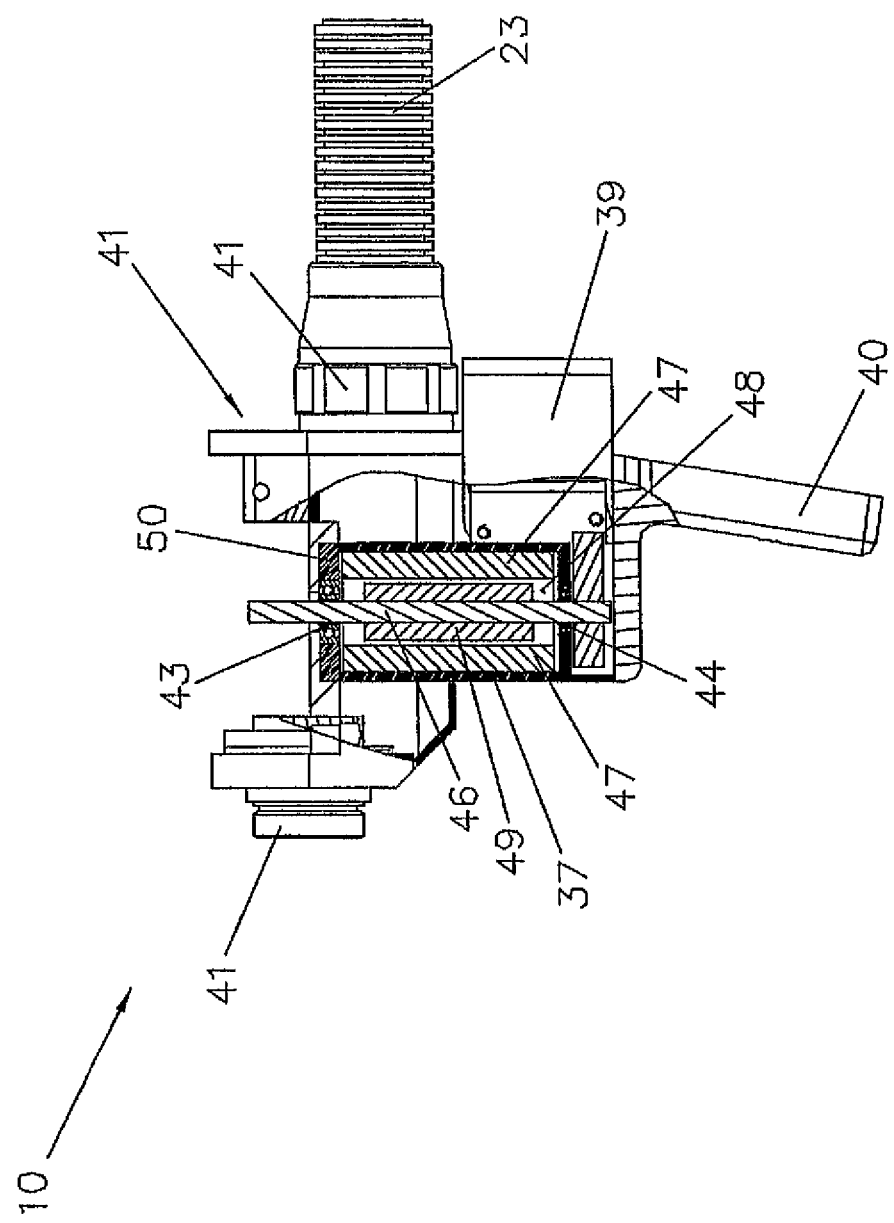
FIG. 7 shows another embodiment of the welding torch in a simplified, schematic illustration.

FIGS. 6 and 7 depict two further exemplary embodiments of the welding torch 10. The difference from the construction according to FIGS. 2 to 5 resides in that the opening 48 provided in the base body 37 no longer extends throughout the whole base body 37, but is closed on one side, which means that in the base body 37 on one side of the opening 38 just one bearing bore or shaft passage is arranged, through which the bearing 43 or 44 is directly installed into the base body 37, whereas the opposite side of the opening 38 has such a large diameter as to allow the stator, particularly the stator winding 47 or stator magnets, to be inserted. As a result, an additional fastening means for the fixation of the bearing, like, for instance, the intermediate piece 50, can be obviated on the side where the bearing 43, 44 is directly installed in the base body 37. To this end, the construction according to FIG. 6 is such that the bearing 43 located next to the drive roller 31 is directly embedded in the base body 37, whereas, in the construction according to FIG. 7, the bearing 44, i.e. the bearing 44 located farther remote from the drive roller 31, is arranged in the base body 37. In the construction according to FIGS. 6 and 7, the installation of the individual parts of the drive motor 33 in this case is possible just from one side, yet while enhancing the stability or rigidity of the torch housing 28 and, in particular, base body 37.

Figure 8:
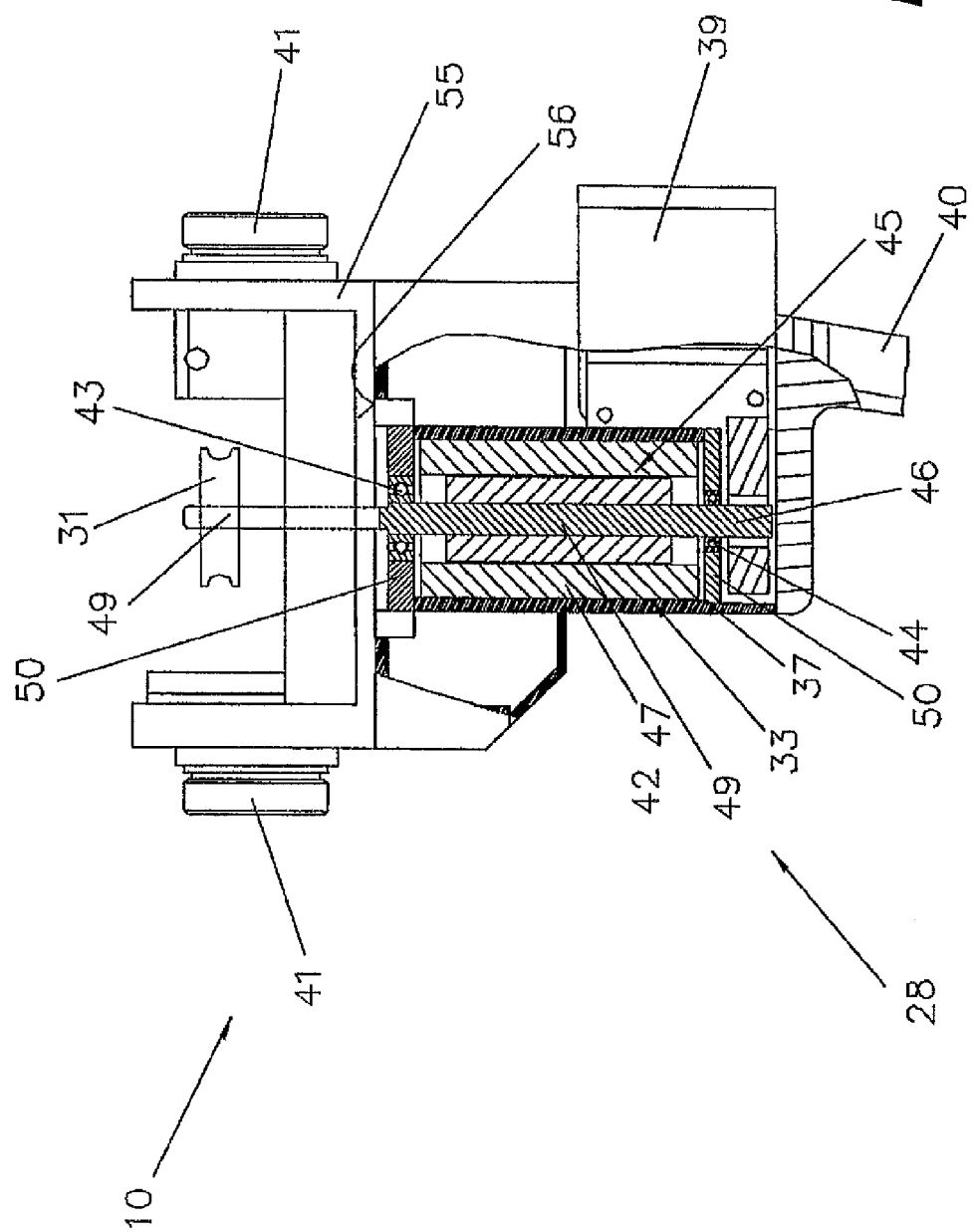
FIG. 8 shows another setup of the welding torch and integrated drive motor in a simplified, schematic illustration.

According to the exemplary embodiment depicted in FIG. 8, a mounting element 55 to which the required parts or guides are attached is added to the torch housing 28. The mounting element 55, for instance, carries the cover part 38 to protect said parts against contamination and contacting. The welding torch 10 in this case is constructed in a manner that the drive motor 33 is integrated in the base body 37 and the base body 37, on the side where the motor shaft 46 for connection with the drive roller 31 or gear projects out of the base body 37, comprises a mounting platform 56 to which the mounting element 55 is fastened. The design of the mounting platform 56 is not critical. It may, for instance, be realized by a plane surface as illustrated so as to enable a simple mounting plate, or the mounting element 55, to be mounted to this mounting platform 56. It is, of course, also possible for the mounting platform 56 to have a special contour on which an accordingly designed mounting element 55 will subsequently be placed.

With such a configuration of the welding torch 10, it is ensured that any part or element such as, for instance, the coupling mechanisms 41 for the tube bend 29 and the hose pack 23, the lines 42 for connecting the two coupling mechanisms 41 as well as the bearing of the pressure roller 32 can be assembled or mounted on the mounting element 55 independently of the base body 37. On the other hand, the parts for the drive motor 33 are mounted in the base body 37. Subsequently, the two parts, i.e. the base body 37 and the mounting element 55, merely have to be connected with each other to obtain a functioning welding torch 10.

Very simple and quick mounting of the welding torch 10 is thereby ensured in an advantageous manner. Another advantage resides in that a standardized construction of the base body 37 with the drive motor 33 is used, on which different constructions of different welding torch configurations can subsequently be mounted so as to no longer require different complete torch housings 28 for the great variety of welding torch types. Thus, considerable cost savings will be achieved, since the welding torch construction will always be mounted on the standardized base body 37 with just the mounting element 55 having to be differently constructed as a function of the respective welding torch type.

Figure 9:
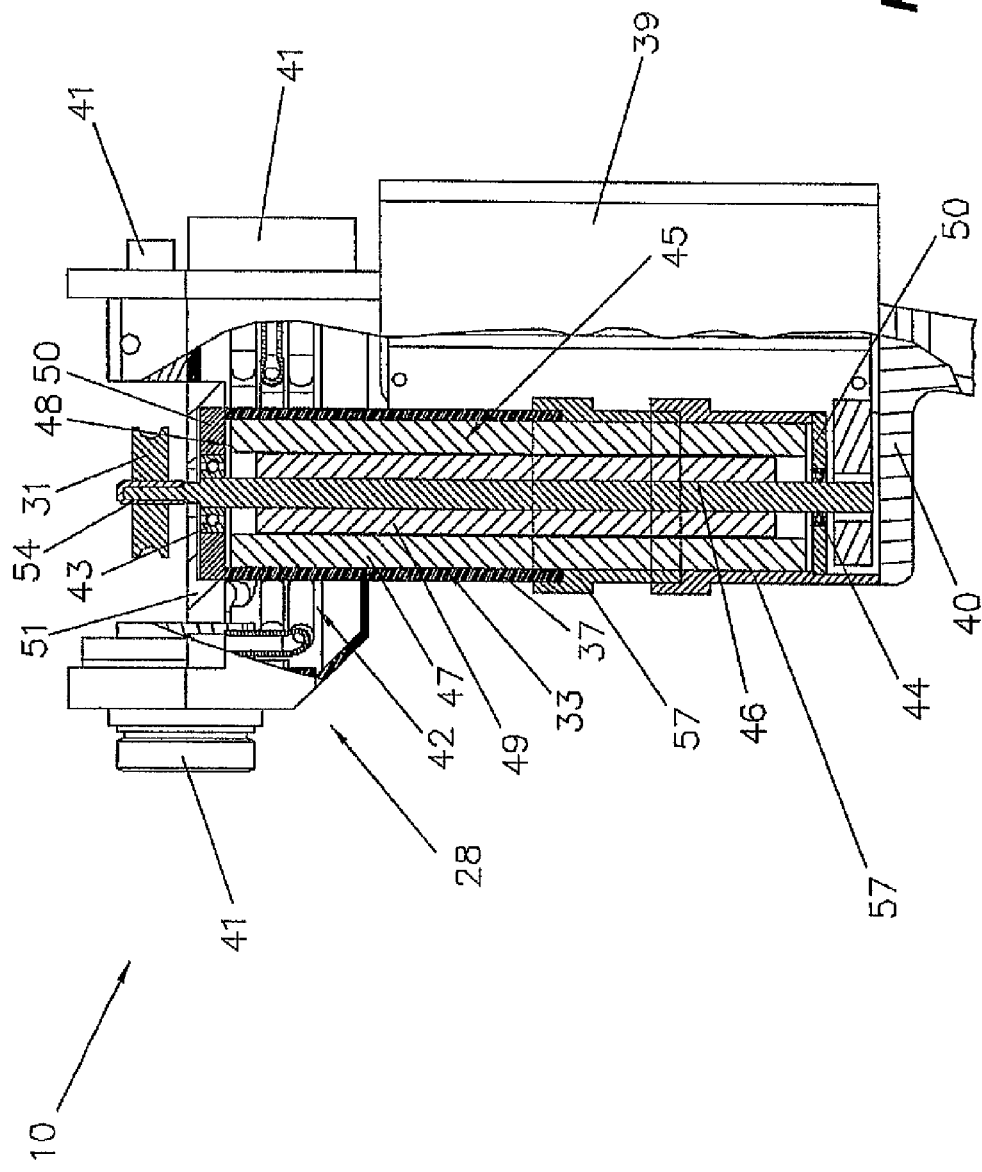
FIG. 9 shows an option of expansion of the welding torch in a simplified, schematic illustration.
Figure 10:
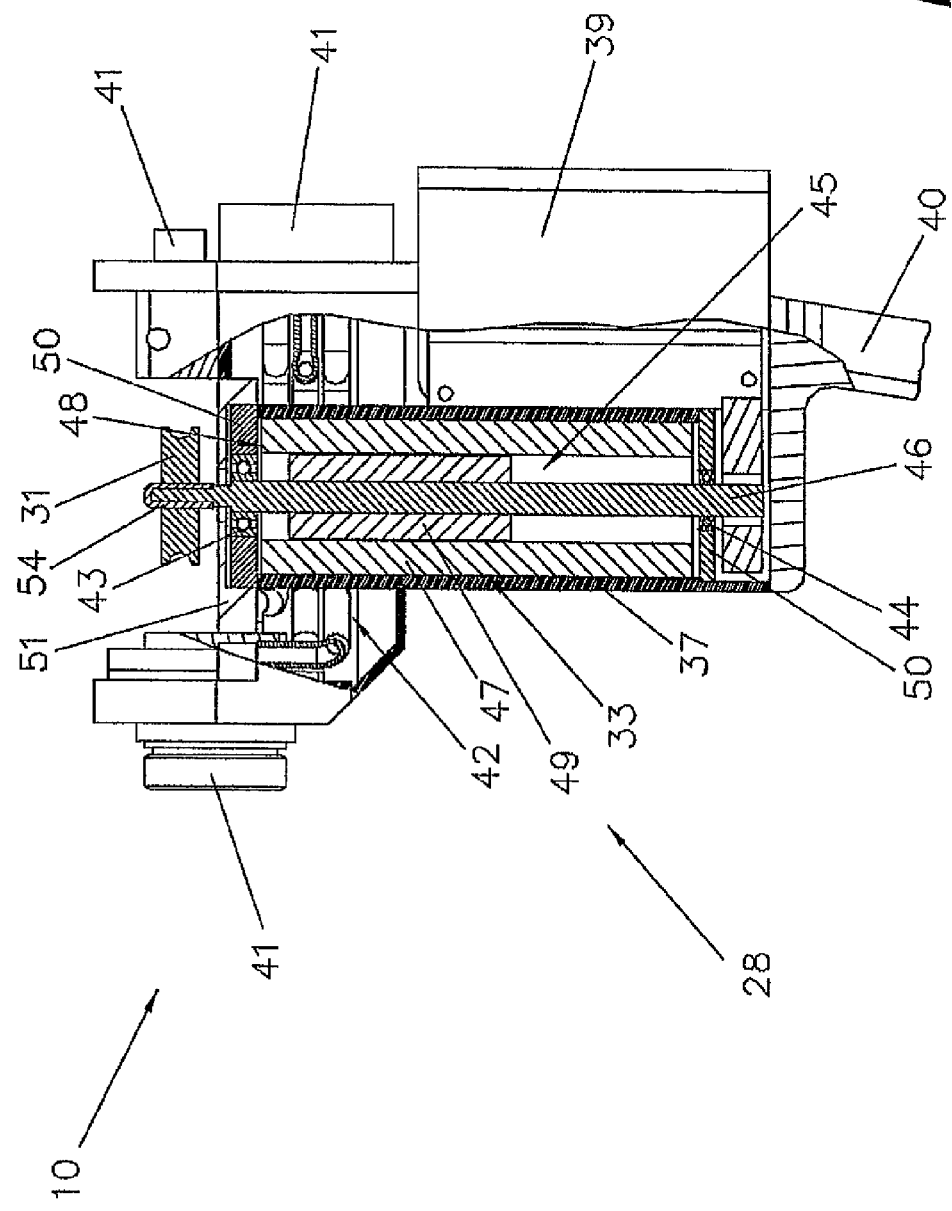
FIGS. 10 and 11 in simplified, schematic illustrations show options of adaptation of the output or response behavior of a drive motor, with the drive motor being integrated in the welding torch.
Figure 11:
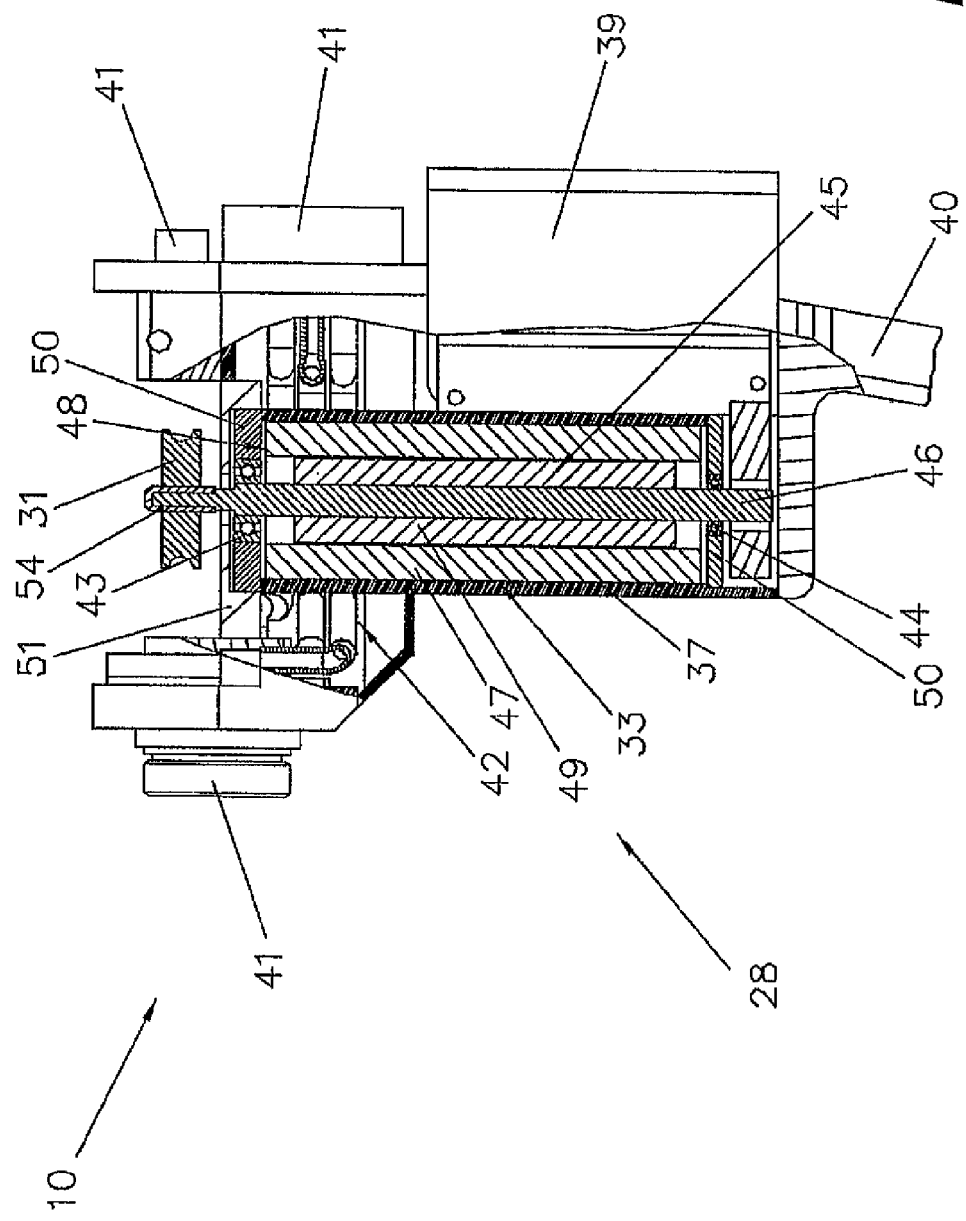

FIGS. 9 to 11 depict a variant embodiment in which the welding torch 10 can be modularly expanded and the output of the drive motor 33 can be readily adapted accordingly.

To this end, the drive motor 33, particularly the stator winding 47 or the stator magnets and/or the rotor winding 49 or rotor magnets, are expandable by additional modules 57, in particular, to adapt the output and response behavior of the drive motor 33. This is, for instance, effected in that, as is apparent from FIG. 9, just one or several modules 57 are coupled to the base body 37 such that an accordingly longer stator winding 47 and an appropriate rotor 45 can subsequently be installed. It is thereby achieved in an advantageous manner that always the same torch housing 28, or the same base body 37, respectively, can be used for varying outputs of the drive motor 33, with an accordingly larger drive motor 33 having an increased motor power being installable due to the expansion of the base body 37 by the modules 57. The costs of the welding torch 10 can, thus, be kept low, using always the same torch housing 28 rather than requiring different torch housings 28 for different drive motors 33.

A special adaptation of the output or response behavior of the drive motor 33 is apparent from FIGS. 10 and 11. In this case, the base body 37 is dimensioned for an appropriate stator winding 47 with the output or response behavior of the drive motor 33 being determined by the rotor. This is effected in that, for instance, a smaller rotor pack, in particular a smaller rotor winding 49 as illustrated in FIG. 10, is used to provide an excellent response behavior of the drive motor 33. The drive motor 33 will, thus, very quickly react to a pregiven change in speed or reversal of direction. If, however, a higher output is required, it will do to replace the rotor with a rotor having a larger rotor pack, in particular rotor winding 49 as is apparent from FIG. 11.

Figure 12:
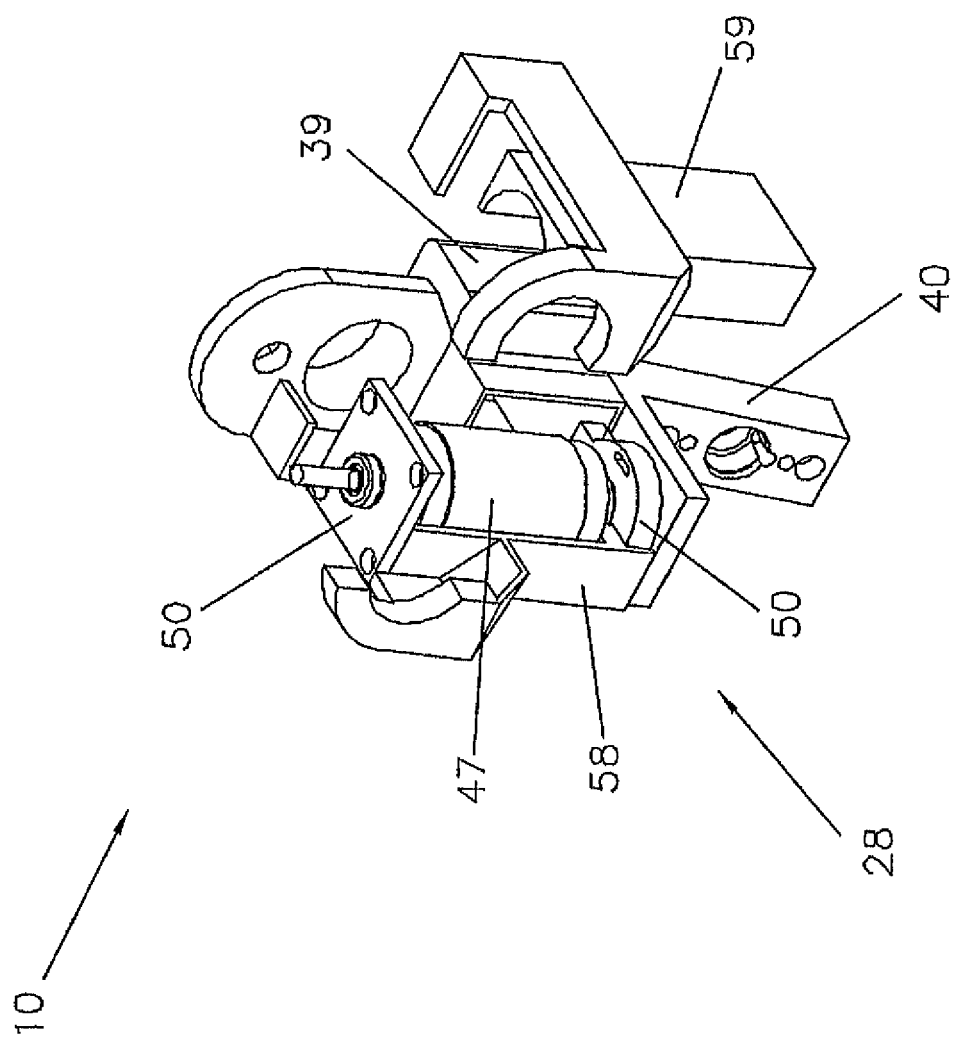
FIG. 12 depicts another exemplary embodiment of a welding torch assembly with an integrated drive motor.

FIG. 12 illustrates a further exemplary embodiment of a construction to integrate the drive motor 33 in the welding torch 10 and, in particular, base body 37. Here, the torch housing 28 is divided along a rotor axis, i.e., the base body 37 is now formed by two semi-shells 58, 59 in which the drive motor 33 is integrated. This construction provides very simple mounting, since the drive motor parts merely have to be inserted in one of the semi-shells 58 or 59 and will subsequently be fixed or fastened by fastening the second semi-shell 59 or 58 to the first semi-shells 58 or 59, respectively.

Figure 13:
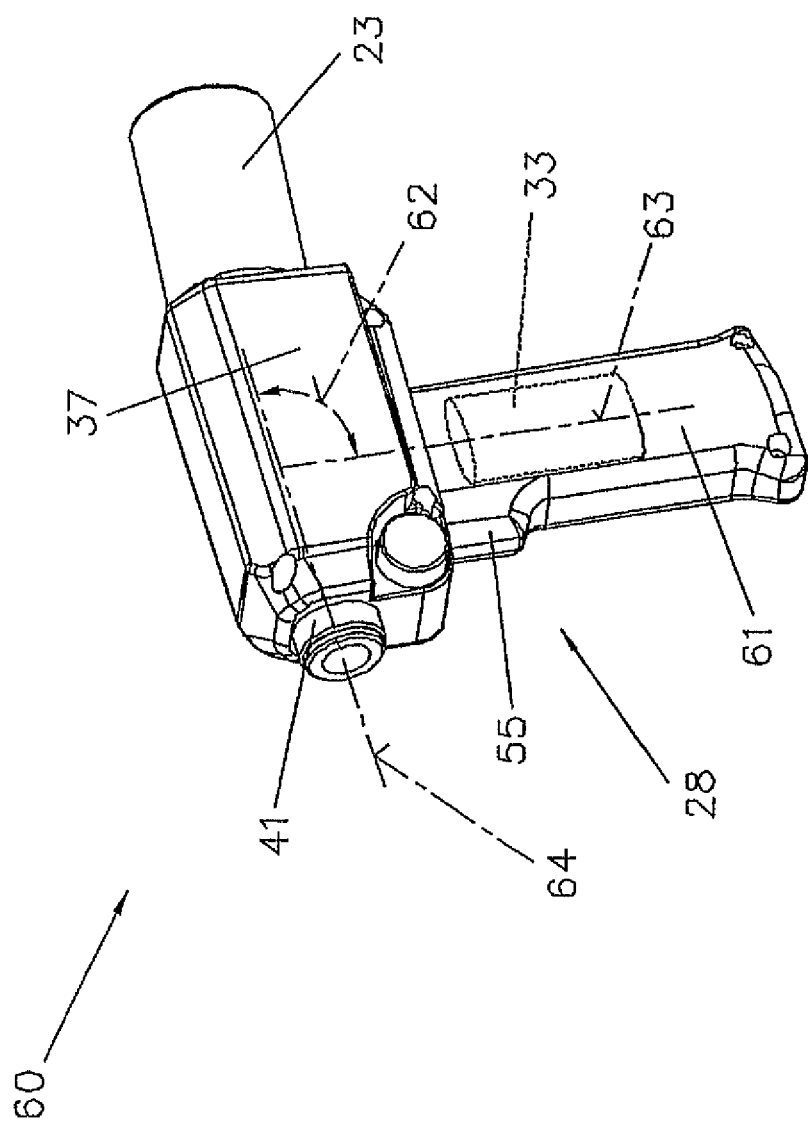
FIG. 13 depicts an embodiment of a manual welding torch.

It is, moreover, possible to realize the construction with the drive motor 33 integrated in the torch housing 28 even with a manual welding torch 60, as is schematically illustrated in FIG. 13. The torch housing 28 is designed as a gun welding torch with the drive motor 33 being installed in the torch housing 28 in the region of the grip 61, as is schematically indicated by dot-and-dash lines. To this end, the drive motor 33, in particular the motor shaft 46, is again arranged at an angle 62 of about 900 relative to the welding wire 13, which means that a rotor axis 63 extending in the middle of the motor shaft 46 is oriented at an angle 62 of 900 relative to a welding wire feed axis 64 extending in the middle of the welding wire 13. Such an orientation of the drive motor 33 relative to the welding wire 13 also applies to previous FIGS. 1 to 12. It is thereby again possible to mount the drive roller 31 directly on the motor shaft 46 and, hence, realize a direct drive for the welding wire feed.

It is, however, also possible to configure the welding torch 10, in particular the manual welding torch 60, in a different way by orienting the rotor axis 63 relative to the welding wire feed axis 64 no longer at an angle of 900 as in previously described FIGS. 1 to 13, but by making the orientation of the rotor axis 63 relative to the welding wire feed axis 64 to extend centrically or in parallel. Such an exemplary embodiment is, however, not illustrated, since in that case only the base body 37 will have to be accordingly designed to integrate the drive motor 33. With a welding torch 10 or manual welding torch 60, this may, for instance, be realized by a planetary gear for the welding wire feed, to which end the motor shaft 46 is arranged axially to the welding wire 13, in particular welding wire feed axis 64, and the welding wire 13 extends through the motor shaft 46, which is designed to be hollow. Naturally, it is also possible to arrange the drive motor 33 in parallel rather than in the welding wire axis, and integrate it into the base body 37.

Basically, it should be noted that in the previously shown exemplary embodiments of FIGS. 1 to 13 at least one or several switching elements (not illustrated) are integrated in the torch housing 28 or base body 37, respectively, which switching elements serve to control the welding process in a manner already known from the prior art. It is, moreover, possible to arrange several drive motors 33 in the torch housing 28 or base body 37, which are again integrated in the torch housing 28. In this respect, it is also possible to integrate but one drive motor 33 in the torch housing 28 and additionally install one or several further drive motors in the torch housing 28 as in accordance with the prior art design including a stator housing. By the integration or use of several drive motors 33, it is feasible to devise a welding torch 10 with a multi-roller drive. It is also possible to use but one drive roller 31 with a drive motor 33, as is known from the prior art, yet to appropriately couple further rollers with the drive roller 31, which means that appropriate coupling of the individual rollers is, for instance, realized by using toothed wheels so as to ensure a suitable force transmission to all or some of the rollers via the one drive motor 31 employed.

FIGS. 14 to 19 illustrate an independent drive motor 33 in different structural variants. Here, the drive motor 33 is configured as an independent structural unit, i.e. with a stator housing 65.

The drive motor 33 contains the stator housing 65, to the end sides of which a bearing shield or an intermediate piece 50 is each fastened with a respective bearing 43, 44 integrated therein. The stator pack, in particular stator winding 47, is arranged in the interior of the stator housing 65. The drive motor 33 further comprises a rotor 45, which is formed by a motor shaft 46 with a rotor pack, in particular rotor magnet 49, fastened thereto. The rotor 45 is arranged in the center of the stator pack or stator housing 65 such that the rotor pack is arranged within the stator pack. The rotor 45 is rotationally held via bearings 43, 44.

According to the invention, it is provided that the drive motor comprises a special electrical insulation, which may be arranged in different regions of the drive motor 33, said electrical insulation being formed by an insulation layer 54. It is especially provided that at least a part of the motor shaft 46, in particular the drive roll retention zone, is electrically insulated from a housing, in particular the stator housing 65 or the base body 37 of an external component such as the welding torch 10. In this context, it should be mentioned that this construction of the drive motor 33 according to the invention with the insulation layer 54 can also be used in the previously described exemplary embodiments of FIGS. 1 to 13, to which end it will do to remove the stator housing 65 so as to enable the remaining parts of the drive motor 33 to be installed in the torch housing 28 and, in particular, base body 37. By the arrangement of the insulation layer 54 it is ensured that an electric potential on a partial region of the motor shaft 46 is separated from the stator housing 65 or base body 37 and, hence, no current will flow to the welding torch 10 over structural components of the drive motor 33 or any interfaces. An advantage also resides in that for an application in welding technology the drive roller 31 can be directly mounted to the motor shaft 46 without an additional insulation having to be arranged so as to reduce manufacturing expenses and, hence, costs.

In the embodiment illustrated in FIG. 15, the insulation layer 54 is arranged on the outer circumference of the rotor pack, in particular rotor magnets 49. At the same time, bearings 43, 44 are likewise insulated relative to the stator housing 65 by an appropriate insulation layer 54. If, for instance, an electrically conductive drive roller 31 is directly fastened to the motor shaft 46, a current flow is able to propagate from the drive roller 31 via the motor shaft 46 and the rotor magnets 49, yet this current flow will subsequently be stopped on account of the insulation layer 54, thus preventing its spreading to the stator winding 47 and stator housing 65. The inevitable or inherently present air gap in the drive motor 33 does not suffice for an insulation complying with the respective safety regulations.

In FIG. 16, the insulation layer is arranged between the motor shaft 46 and the rotor pack, in particular rotor magnets 49, and, in addition, also the bearing sites, in particular bearings 43, 44, are insulated such that no current flow can take place to the stator via the motor shaft 46.

Figures 17, 18, 19:
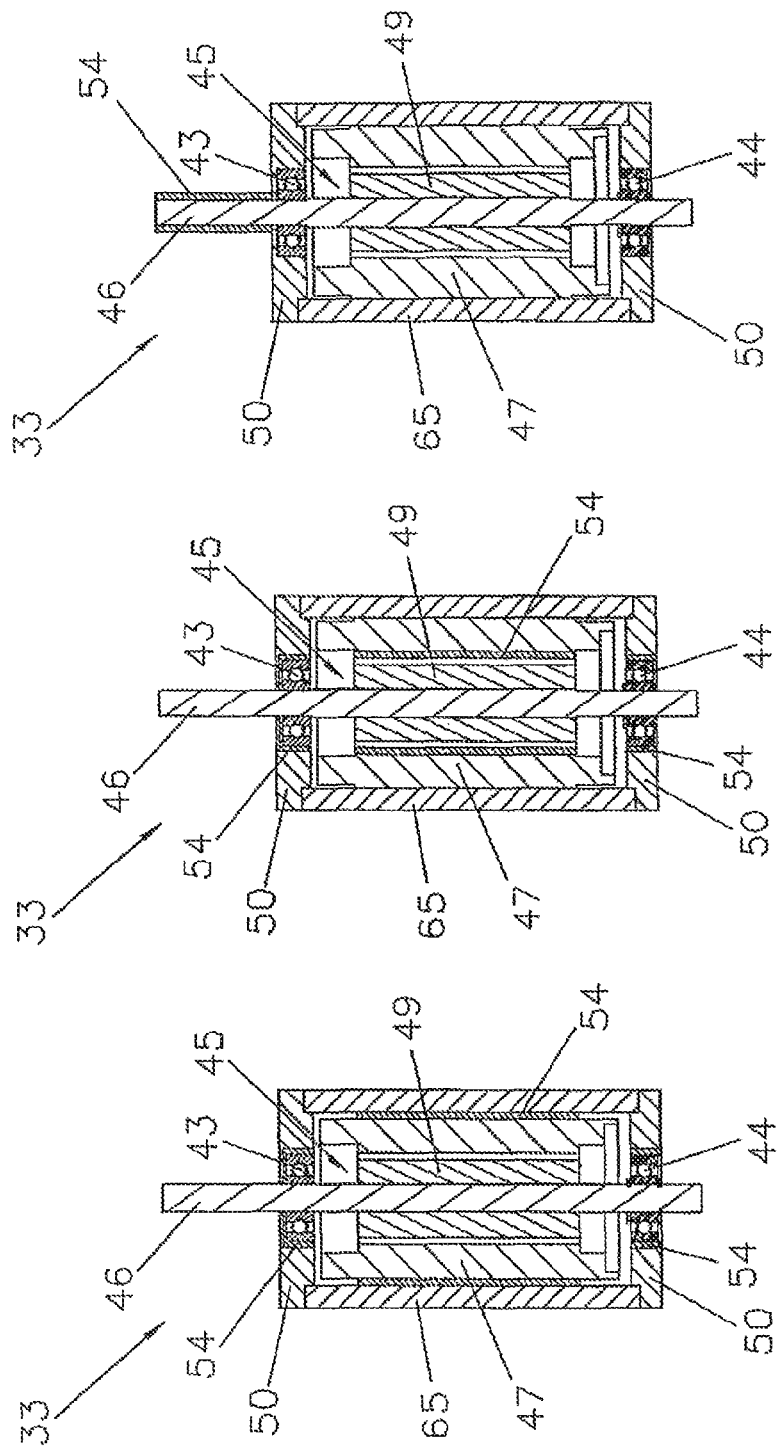

According to the configuration shown in FIG. 17, the insulation layer 54 is arranged between the stator housing 65 and the stator pack, in particular stator winding body, to which end the bearings 43, 44 are again electrically insulated relative to the stator housing 65.

From FIG. 18, it is apparent that the insulation layer is arranged on the inner surface of the stator winding, in particular on the side facing the rotor magnets 49, and, in addition, also the bearing sites, in particular bearings 46, 47, are insulated.

It is, however, also possible according to FIG. 19, that the insulation layer 54 is only applied or arranged over a partial region of the motor shaft 46, in particular in the end region of the drive roller 31, which means that the insulation layer 54 is arranged in the region where a live part abuts or is fastened. Since, at an application in welding technology, the welding wire 13 is powered with current, a current flow will take place over the welding wire 13 to the drive roller 31. If the drive roller 31 is directly mounted to the motor shaft 46, a respective current flow from the drive roller 31 to the motor shaft 46 may occur. By arranging the insulation layer 54 in the mounting zone of the drive roller 31, this can be readily prevented. With this solution, it is not necessary to electrically insulate that the bearing, in particular bearings 43, 44, relative to the stator housing 65, since a current flow can in no way act on the drive motor 31.

The insulation of the bearings 43, 44 as shown in FIGS. 14 to 19 allows the bearing site, in particular bearing 43 and 44, to be pressed into an insulation sleeve. It is, however, also possible to form the bearing site, in particular bearings 43 and 44, by an insulating hybrid bearing in which ceramic roll bodies are inserted or a bearing ring made of electrically nonconductive material is formed.

It is, of course, also possible to make the motor shaft 46 of an electrically non-conductive material, in particular ceramic material, whereby the same electrically insulating effect will be achieved, yet without using insulation layers 54.

What is claimed is:

1. A wire feed unit including a housing or a base body, respectively,
   wherein a drive motor for feeding a welding wire is arranged in the housing or base body, respectively, and wherein a drive unit formed by at least one drive roller, one pressure roller, and the drive motor is arranged in a torch housing for feeding a welding wire,
   wherein the torch housing comprises the base body that forms a stator housing of the drive motor of the drive unit, the base body comprising an outermost wall of a welding torch, the drive motor comprising a stator winding or stator magnets directly installed in the base body of the torch housing, and
   wherein bearings are provided on or within the base body of the torch housing to stabilize and position a rotor of the drive motor.

2. A welding wire feed drive motor of a welding torch, including bearings, a rotor, in particular a motor shaft and a rotor winding or rotor magnets, and a stator pack, in particular a stator winding or stator magnets, wherein at least a part of the motor shaft is electrically insulated from a stator housing, or a base body, of an external component in the retention zone of a drive roller.

3. The drive motor according to claim 2, wherein the electric insulation is formed by an insulation layer.

4. The drive motor according to claim 3, wherein the insulation layer is arranged between the housing and the stator winding.

5. The drive motor according to claim 3, wherein the insulation layer is arranged on the inner surface of the stator winding and the bearing site is additionally insulated.

6. The drive motor according to claim 3, wherein the insulation layer is arranged between the motor shaft and the rotor winding, and the bearing site is additionally insulated.

7. The drive motor according to claim 2, wherein the motor shaft is made of an electrically non-conductive material.

8. The drive motor according to claim 3, wherein the insulation layer is applied or arranged over a partial region of the motor shaft.

9. The drive motor according to claim 2, wherein the bearing is pressed in an insulating sleeve.

10. The drive motor according to claim 2, wherein the bearing comprises an insulating hybrid bearing in which ceramic roll bodies are inserted or a bearing ring made of electrically non-conductive material is formed.

11. The drive motor according to claim 2,
    wherein the drive motor is capable of being integrated in a torch housing forming the stator housing, of a welding torch including the torch housing,
    wherein a drive unit formed by at least one drive roller, one pressure roller, and the drive motor is arranged in the torch housing for feeding a welding wire,
    wherein the torch housing comprises a base body that forms the stator housing of the drive motor of the drive unit, the base body comprising an outermost wall of the welding torch, the drive motor comprising a stator winding or stator magnets directly installed in the base body of the torch housing, and
    wherein bearings are provided on or within the base body of the torch housing to stabilize and position a rotor of the drive motor.

* * * * *